US011167161B1

(12) United States Patent
Suntharalingam

(10) Patent No.: US 11,167,161 B1
(45) Date of Patent: Nov. 9, 2021

(54) HYDRANT MONITORING SYSTEM

(71) Applicant: Senthuran Pon Suntharalingam, Scarborough (CA)

(72) Inventor: Senthuran Pon Suntharalingam, Scarborough (CA)

(*) Notice: Subject to any disclaimer, the term of this patent is extended or adjusted under 35 U.S.C. 154(b) by 756 days.

(21) Appl. No.: 16/031,115

(22) Filed: Jul. 10, 2018

(51) Int. Cl.
*A62C 37/50* (2006.01)
*E03B 9/02* (2006.01)
*G01F 23/296* (2006.01)
*E03B 9/06* (2006.01)

(52) U.S. Cl.
CPC ............ *A62C 37/50* (2013.01); *E03B 9/02* (2013.01); *E03B 9/06* (2013.01); *G01F 23/2962* (2013.01); *Y10T 137/5456* (2015.04)

(58) Field of Classification Search
CPC .......... A62C 37/50; A62C 35/20; E03B 9/02; E03B 9/06; E03B 9/04; G01F 23/2962; Y10T 137/5327; Y10T 137/5456; Y10T 137/5468
USPC ........................ 137/272, 294, 296; 138/104
See application file for complete search history.

(56) References Cited

U.S. PATENT DOCUMENTS

| | | | |
|---|---|---|---|
| 2,980,125 A | 4/1961 | Grant | |
| 4,651,771 A * | 3/1987 | Borenstein | E03B 9/06 137/296 |
| 6,561,214 B2 | 5/2003 | Heil | |
| 6,816,072 B2 * | 11/2004 | Zoratti | A62C 31/28 137/272 |
| 7,343,794 B1 | 3/2008 | Pucel | |
| 8,589,092 B2 | 11/2013 | Plouffe | |
| 8,614,745 B1 * | 12/2013 | Al Azemi | H04N 7/183 348/159 |
| 8,657,021 B1 | 2/2014 | Preta | |
| 9,670,650 B2 | 6/2017 | Pinney | |
| 2011/0308638 A1 * | 12/2011 | Hyland | E03B 9/06 137/299 |
| 2013/0145826 A1 * | 6/2013 | Richarz | G01M 3/243 73/49.1 |
| 2017/0216645 A1 | 8/2017 | Silvers | |
| 2017/0370893 A1 * | 12/2017 | West | E03B 7/072 |

FOREIGN PATENT DOCUMENTS

CA           2154433 A1 *   1/1997   ............... E03B 9/14

* cited by examiner

*Primary Examiner* — Kevin F Murphy
*Assistant Examiner* — Jonathan J Waddy
(74) *Attorney, Agent, or Firm* — Kyle A. Fletcher, Esq.

(57) ABSTRACT

The hydrant monitoring system determines whether water is present in a dry-barrel fire hydrant. The hydrant monitoring system couples to a port of the hydrant using a hydrant port adapter. The hydrant monitoring system supports an operator interface unit mounted within a protective frame next to the hydrant on a fixed arm. A movable arm carries a distance sensor aimed downward that slides into and out of the hydrant on the fixed arm. The hydrant monitoring system is used by making a first distance measurement outside of the hydrant, making a second distance measurement inside of the hydrant, and subtracting the two to determine how far below ground level the bottom of the barrel is. If the bottom is not at a predetermined depth, a request to drain or service the hydrant may be initiated.

19 Claims, 6 Drawing Sheets

HYDRANT MONITORING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of firefighting equipment, more specifically, a hydrant monitoring system.

Many fire hydrants are located in cold regions where there is a risk of freezing. In these locations, a type of fire hydrant known as a dry-barrel hydrant is commonly used. A dry-barrel hydrant has a shutoff valve that is located at the very bottom of the hydrant, which may be located at a depth of six or more feet below ground level. The barrel of the hydrant that rises above the valve remains empty so that there is no water in the barrel to freeze. The barrel may be designed to be self-draining or it may require that the water in the barrel is pumped out after using the hydrant once the valve has been turned off.

Under some conditions, a dry-barrel hydrant may retain water in the barrel, which risks disabling the hydrant, damaging the hydrant, and/or damaging the water main in freezing weather condition. Reasons for water in the barrel may include, but are not limited to, a failure of a self-draining barrel to drain, failure to pump water out of the barrel after use, a leaking shutoff valve, a leaking water main near the hydrant, and/or a high water table at the hydrant location. Hydrants may be inspected frequently to detect water being retained in the barrel.

SUMMARY OF INVENTION

The hydrant monitoring system determines whether water is present in a dry-barrel fire hydrant. The hydrant monitoring system couples to a port of the hydrant using a hydrant port adapter. The hydrant monitoring system supports an operator interface unit mounted within a protective frame next to the hydrant on a fixed arm. A movable arm carries a distance sensor aimed downward that slides into and out of the hydrant on the fixed arm. The hydrant monitoring system is used by making a first distance measurement outside of the hydrant, making a second distance measurement inside of the hydrant, and subtracting the two to determine how far below ground level the predetermined depth, a request to drain or service the hydrant may be initiated.

An object of the invention is to determine a first distance measurement from a distance sensor to the ground while the distance sensor is outside of a hydrant.

Another object of the invention is to determine a second distance measurement from a distance sensor to the bottom of the hydrant barrel while the distance sensor is inside of a hydrant.

A further object of the invention is to determine the distance from the bottom of the barrel of a hydrant to ground level by subtracting the first distance measuring from the second distance measurement and reporting the difference.

Yet another object of the invention is to provide a support frame that allows the distance sensor to be mounted to an open port of the hydrant and slid into and out of the hydrant through the open port.

These together with additional objects, features and advantages of the hydrant monitoring system will be readily apparent to those of ordinary skill in the art upon reading the following detailed description of the presently preferred, but nonetheless illustrative, embodiments when taken in conjunction with the accompanying drawings.

In this respect, before explaining the current embodiments understood that the hydrant monitoring system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hydrant monitoring system.

It is therefore important that the claims be regarded as including such equivalent construction insofar as they do not depart from the spirit and scope of the hydrant monitoring system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied brief summary or the following detailed description. As used herein, the word "or" is intended to be inclusive.

Figure 1:
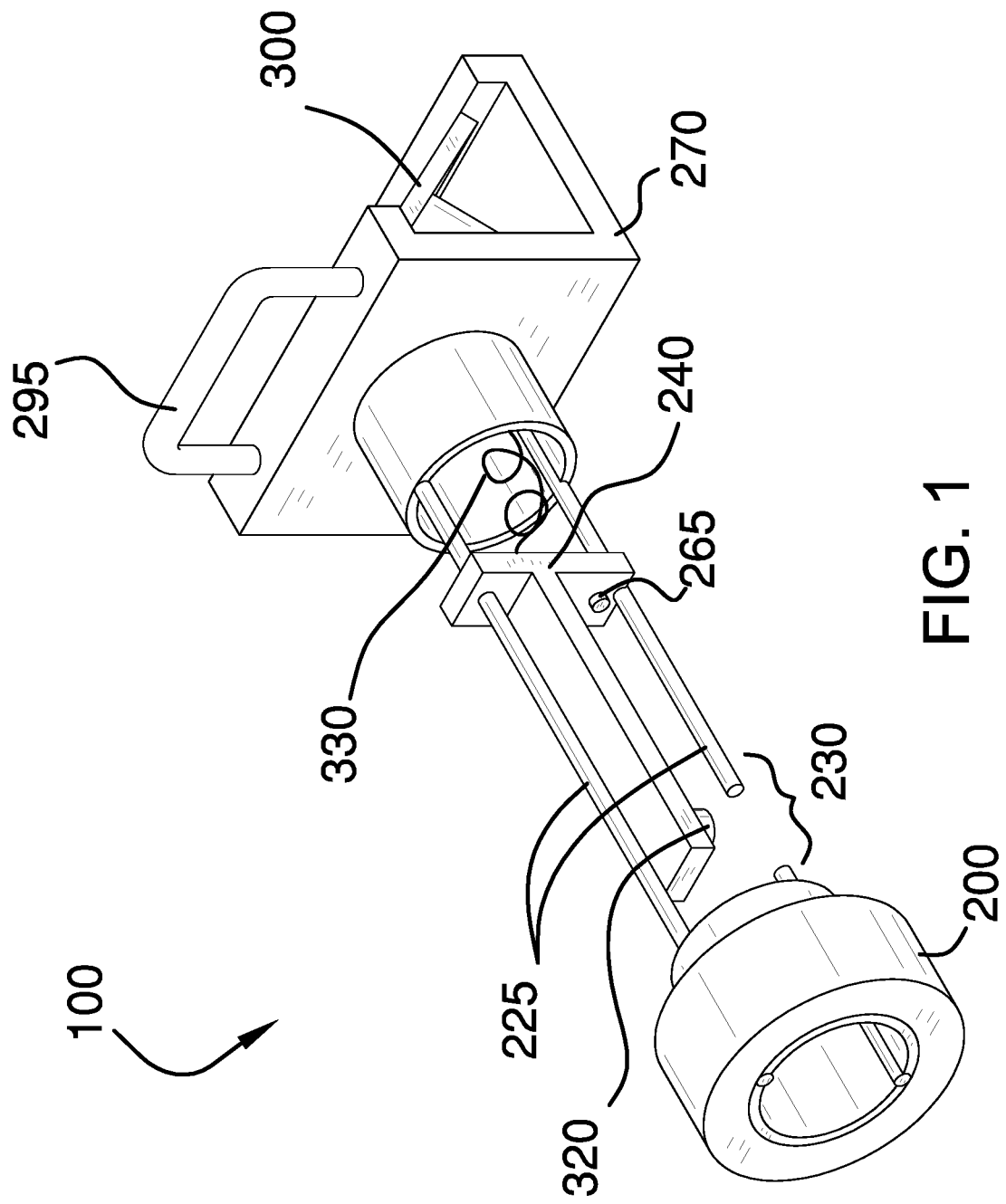
FIG. 1 is a perspective view of an embodiment of the disclosure.
Figure 2:
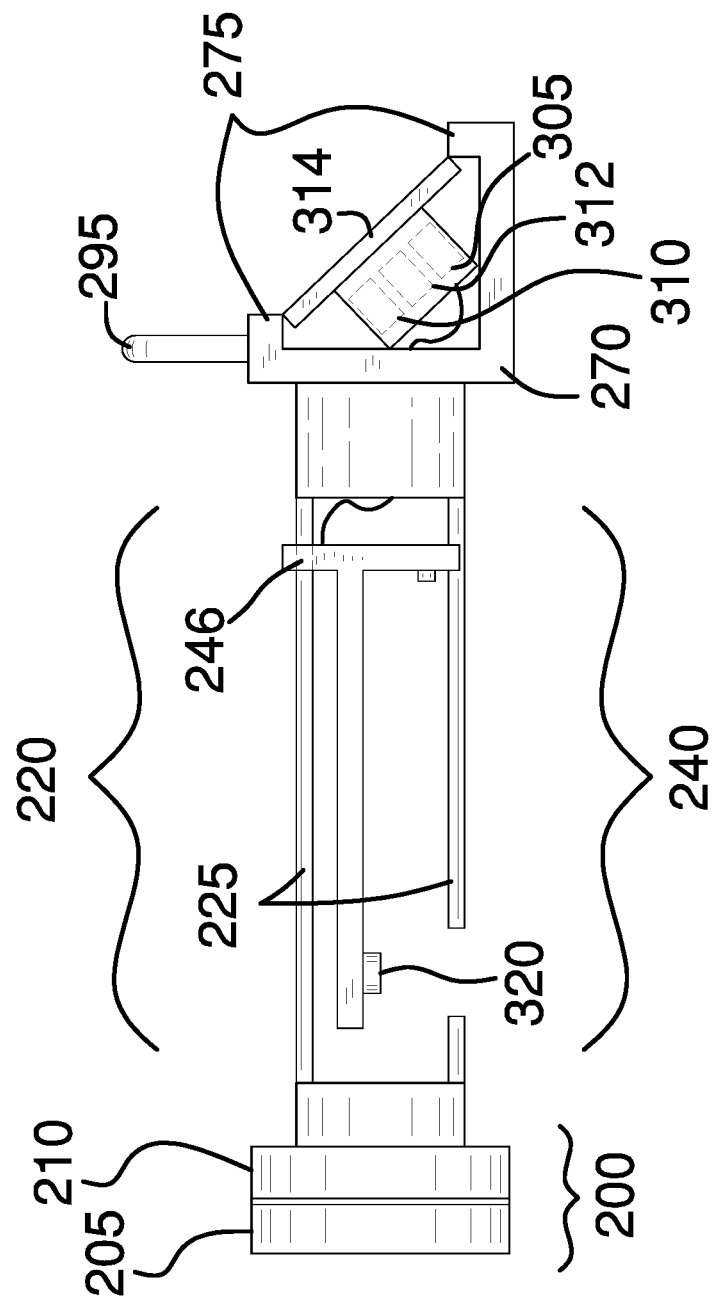
FIG. 2 is a left side view of an embodiment of the disclosure.
Figure 3:
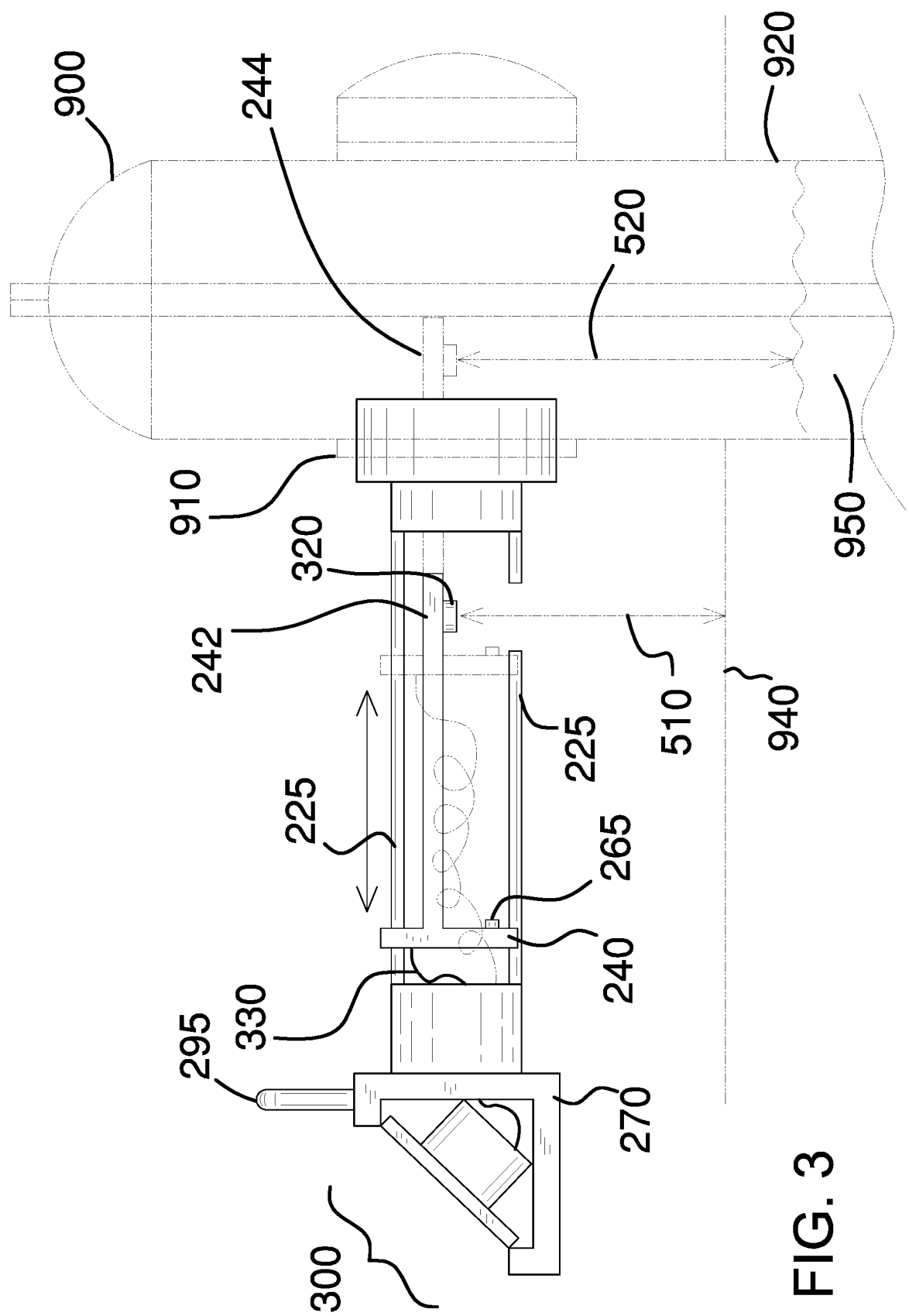
FIG. 3 is a right side view of an embodiment of the disclosure while in use on a fire hydrant.
Figure 4:
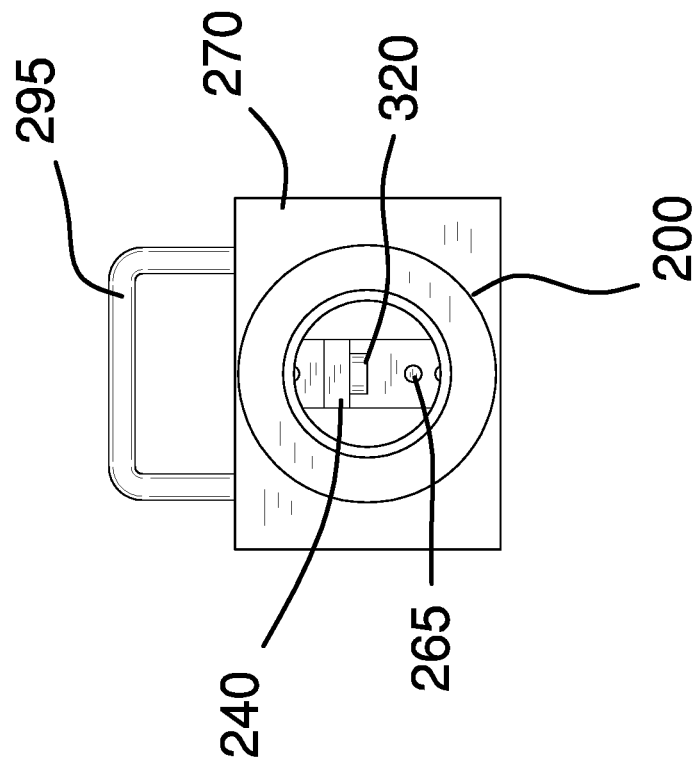
FIG. 4 is a rear view of an embodiment of the disclosure.
Figure 5:
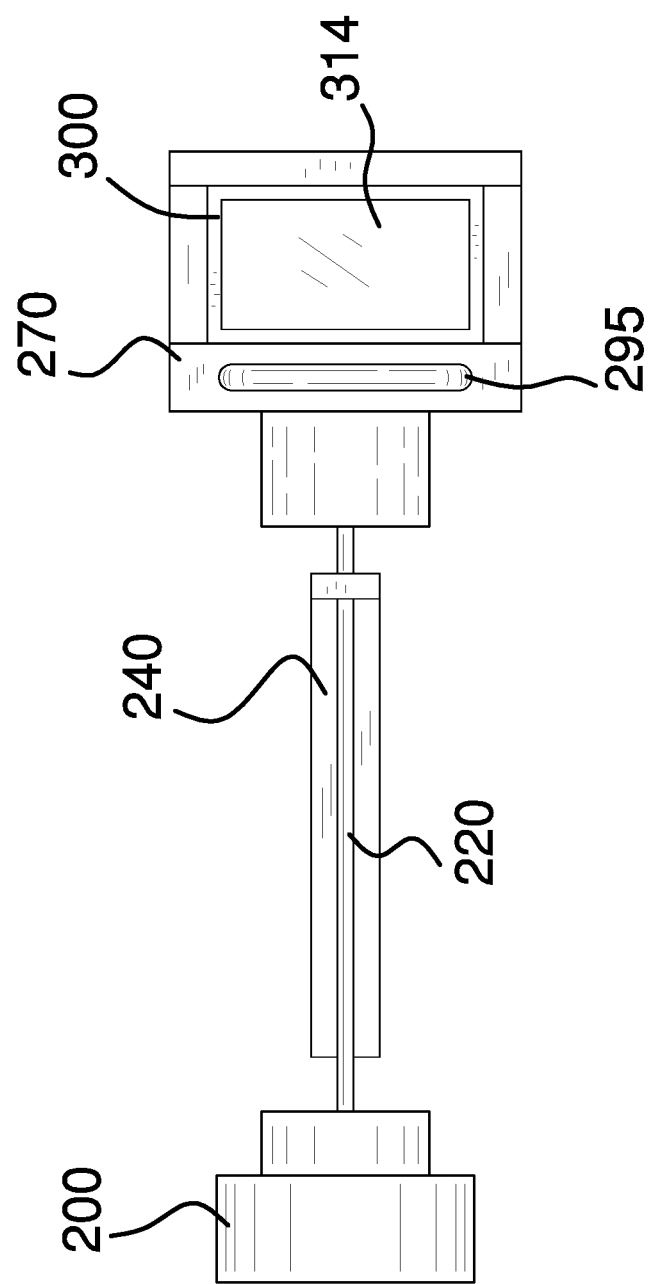
FIG. 5 is a top view of an embodiment of the disclosure.
Figure 6:
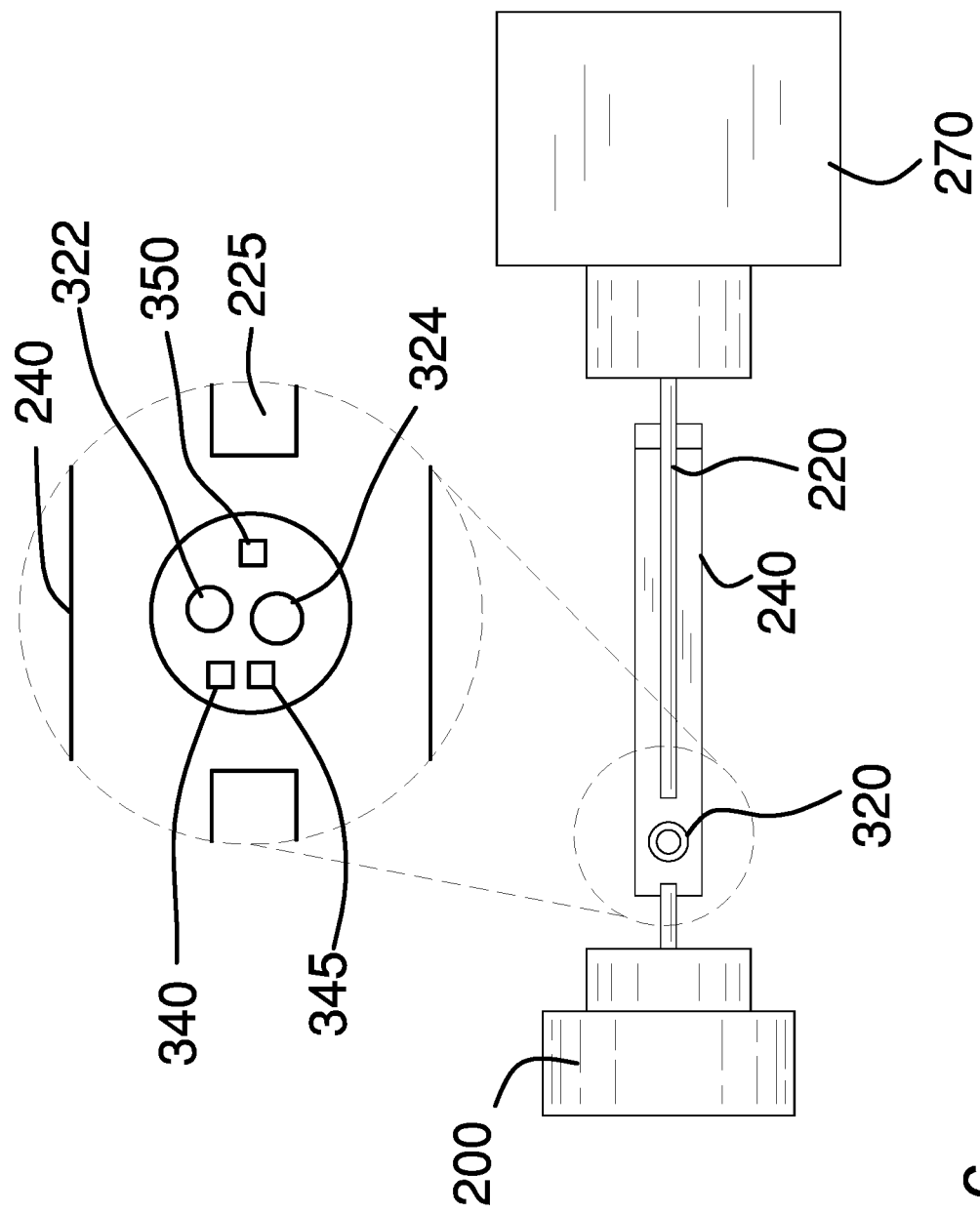
FIG. 6 is a bottom view of an embodiment of the disclosure.

Detailed reference will now be made to a first potential embodiment of the disclosure, which is illustrated in FIGS. 1 through 6.

The hydrant monitoring system 100 (hereinafter invention) comprises a hydrant port adapter 200, a fixed arm 220, a movable arm 240, a protective frame 270, an operator interface unit 300, a distance sensor 320, and a handle 295. The invention 100 may be coupled to a dry barrel fire hydrant 900 and may measure vertical distances inside of the dry barrel fire hydrant 900 and outside of the dry barrel fire hydrant 900 to determine whether the dry barrel fire hydrant 900 is empty.

The hydrant port adapter 200 may be a ring-shaped coupler that is oriented to lie in a vertical plane. The hydrant port adapter 200 may comprise an inside thread such that the hydrant port adapter 200 may mate with a port 910 of the dry barrel fire hydrant 900. The hydrant port adapter 200 may support the invention 100 above ground 940 when the hydrant port adapter 200 is secured to the port 910 of the dry barrel fire hydrant 900.

In some embodiments, the hydrant port adapter 200 may comprise a first ring 205 and a second ring 210 which rotate independently of each other such that the invention 100 may be first ring 205 onto the thread of the port 910 without requiring the rotation of the invention 100 in its entirety.

The fixed arm 220 may comprise two or more support rods 225. The fixed arm 220 may support the protective frame 270 above the ground 940. The fixed arm 220 may support and guide the movable arm 240.

In some embodiments, one of the two or more support rods 225 may comprise a sensor gap 230 so that the distance sensor 320 may be used to make a first distance measurement 510 to determine the distance between the ground 940 and the invention 100.

The movable arm 240 may be an armature that is slidably coupled to the fixed arm 220. The movable arm 240 may slide on the two or more support rods 225 that pass through apertures 246 on the movable arm 240. The movable arm 240 may couple to the fixed arm 220 at the end of the movable arm 240 that is closest to the protective frame 270. The movable arm 240 may extend from the coupling with the fixed arm 220 towards the dry barrel fire hydrant 900.

The distance sensor 320 may be coupled to the bottom of the movable arm 240 at the end of the movable arm 240 that is closest to the dry barrel fire hydrant 900. The length of the movable arm 240 may be such that the distance sensor 320 may be at the center of the dry barrel fire hydrant 900 while the coupling between the movable arm 240 and the fixed arm 220 remains outside of the dry barrel fire hydrant 900.

The movable arm 240 may travel horizontally between a WITHDRAWN POSITION 242 and an INSERTED POSITION 244. When in the WITHDRAWN POSITION 242, the distance sensor 320 may be located outside of the dry barrel fire hydrant 900, above the ground 940, and with an unobstructed view of the ground 940. As a non-limiting example, the distance sensor 320 may be located above the sensor gap 230 when in the WITHDRAWN POSITION 242. When in the WITHDRAWN POSITION 242, the invention 100 may use the distance sensor 320 to make the first distance measurement 510 to determine the distance between the invention 100 and the ground 940.

When in the INSERTED POSITION 244, the distance sensor 320 may be located inside of the dry barrel fire hydrant 900 and at the center of the dry barrel fire hydrant 900. When in the INSERTED POSITION 244, the invention 100 may use the distance sensor 320 to make a second distance measurement 520 to determine the distance between the invention 100 the bottom of a barrel 920 inside of the dry barrel fire hydrant 900.

The movable arm 240 may comprise a locking knob 265 to lock the movable arm 240 in place while making the first distance locking knob 265 may increase friction between the movable arm 240 and the fixed arm 220 when turned in one direction and may decrease friction between the movable arm 240 and the fixed arm 220 when turned in the other direction.

The protective frame 270 may be a holder for the operator interface unit 300. The protective frame 270 may be coupled to the fixed arm 220 at the end of the fixed arm 220 that is opposite the hydrant port adapter 200. The protective frame 270 may be oriented to provide a horizontal surface upon which the operator interface unit 300 may be placed. The protective frame 270 may comprise one or more lips 275 to retain the operator interface unit 300 in the protective frame 270.

The operator interface unit 300 may comprise a processor 310 and a memory 312 wherein the memory 312 contains instructions for causing the processor 310 to control the sequence and timing of measurements, calculations, and presentation of results.

The operator interface unit 300 may direct the operation of the invention 100 by instructing that the distance sensor 320 should be moved to the WITHDRAWN POSITION 242, by initiating the first distance measurement 510, by instructing that the distance sensor 320 should be moved to the INSERTED POSITION 244, by initiating the second distance measurement 520, by performing 940 and the bottom of the barrel 920, and by presenting the distance between the ground 940 and the bottom of the barrel 920 as the result. The operator interface unit 300 may present instructions to move the movable arm 240 and the results on a display screen 314.

The operator interface unit 300 may further comprise a battery 305. The battery 305 may comprise one or more energy-storage devices. The battery 305 may be a source of electrical energy to operate the operator interface unit 300 and the distance sensor 320. The battery 305 may be replaceable or rechargeable.

The operator interface unit 300 may activate the distance sensor 320 to make the distance measurement. The distance measurement may be made by transmitting an ultrasonic pulse from the distance sensor 320 and then timing how long it takes for the distance sensor 320 to receive the ultrasonic pulse after it reflects off of an object. As a non-limiting example, the ultrasonic pulse may comprise a 40 kHz+/−20% tone transmitted for 10 microseconds+/−10%. The distance can be computed as $D=1/2 \times T \times Vs$ where T is the time between transmitting the ultrasonic pulse and hearing the reflection and Vs is the speed of sound which is 343 meters per second (767 miles per hour) at sea level in dry air having a temperature of 20 deg C. (68 deg F.). The factor of 1/2 adjusts for the fact that the ultrasonic pulse makes a round trip from the distance sensor 320 to the object and back again, however the distance of interest is just the distance between the distance sensor 320 and the object.

The operator interface unit 300 may determine the distance from the ground 940 to the bottom of the barrel 920 inside the dry barrel fire hydrant 900. The operator interface unit 300 may be adapted to instruct an operator to make the first distance measurement 510 with the distance sensor 320 in the WITHDRAWN POSITION 242. The operator interface unit 300 may be adapted to instruct the operator to then make the second distance measurement 520 with the distance sensor 320 in the INSERTED POSITION 244. The operator interface unit 300 may then subtract the first distance measurement 510 from the second distance measurement 520 to compute a difference distance. The difference distance represents the distance from the ground 940 to the bottom of the barrel 920 inside the dry barrel fire hydrant 900. If the difference distance is less than a predetermined threshold distance it may indicate that there is water 950 pooling in the bottom of the barrel 920 and therefore the dry barrel fire hydrant 900 may be reported as requiring service. As non-limiting examples, the dry barrel fire hydrant 900 may require pumping to remove the water 950 or may require a repair action.

In some embodiments, the invention 100 may comprise a temperature sensor 340, a humidity sensor 345, a barometric pressure sensor 350 or a combination thereof. Using readings obtained from the temperature sensor 340, the humidity sensor 345, and/or the barometric pressure sensor 350, the operator interface unit 300 may correct the speed of sound based upon the current temperature, humidity, and/or barometric pressure to obtain more accurate distance measurements. If used, the temperature sensor 340, the humidity sensor 345, and/or the barometric pressure sensor 350 may be mounted on the end of the movable arm 240 adjacent to the distance sensor 320 such that they may measure temperature, humidity, and/or pressure inside of the dry barrel fire hydrant 900 when the distance sensor 320 in is the INSERTED POSITION 244.

The distance sensor 320 may comprise an ultrasonic transmitter 322 and an ultrasonic receiver 324 that are mounted adjacent to each other and oriented in the same direction. The ultrasonic transmitter 322 may transmit the ultrasonic pulse and the ultrasonic receiver 324 may detect the reflection of the ultrasonic pulse. The timing between transmission of the ultrasonic pulse and the detection of the ultrasonic pulse may be indicative of the distance between the distance sensor 320 and the object that the ultrasonic pulse reflected off of.

The handle 295 may be an armature coupled to the top of the protective frame 270 for grasping. As a non-limiting example, the invention 100 may be moved by grasping the handle 295 with one hand and the fixed arm 220 near the hydrant port adapter 200 with the other hand.

A sensor cable 330 may electrically couple the distance sensor 320, the temperature sensor 340, the humidity sensor 345, and/or the barometric pressure sensor 350 to the operator interface unit 300. The sensor cable 330 may be coiled so that the sensor cable 330 stretches when the distance sensor 320 is moved to the INSERTED POSITION 244 and the sensor cable 330 retracts when the distance sensor 320 is moved to the WITHDRAWN POSITION 242.

In use, the invention 100 is installed on the dry barrel fire hydrant 900 by removing a cap from the port 910 of the dry barrel fire hydrant 900, lifting the invention 100 into position, and coupling the hydrant port adapter 200 to the port 910. The operator interface unit 300 is then powered on and instructions on the display screen 314 of the operator interface unit 300 are followed. The instructions may have the operator move the movable arm 240 to the WITHDRAWN POSITION 242 and initiate the first distance measurement 510. The instructions may then have the operator move the movable arm 240 to the INSERTED POSITION 244 and initiate the second distance measurement 520. The operator interface unit 300 may then calculate the distance between the ground 940 and the bottom of the barrel 920 and will report this distance on the display screen 314. The operator may compare the reported distance with guidelines put in place for that specific hydrant and, if the reported distance is in violation of the guidelines, the operator may request a service action. Non-limiting examples of service actions may include pumping the water 950 out of the dry barrel fire hydrant 900 or repairing the dry barrel fire hydrant 900, repairing a shutoff valve (not illustrated in the figures), or repairing the water main that the dry barrel fire hydrant 900 is attached to.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, an "adapter" refers to a device that is designed to convert a first interface to a second interface. The conversion may require changes in mechanical shape or size, electrical signaling, power levels, pressures, or other physical attributes.

As used in this disclosure, an "aperture" is an opening in a surface. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "cable" is a collection of insulated wires covered by a protective casing that is used for transmitting electricity or telecommunication signals.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used in this disclosure, a "display" is a surface upon which is presented an image, potentially including, but not limited to, graphic images and text, that is interpretable by an individual viewing the image. When used as a verb, "display" is defined as presenting such an image.

As used herein, "front" indicates the side of an object that is closest to a forward direction of travel under normal use of the object or the side or part of an object that normally presents itself to view or that is normally used first. "Rear" or "back' refers to the side that is opposite the front.

As used in this disclosure, a "handle" is an object by which a tool, object, or door is held or manipulated with the hand.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, a "lock" is a device that prevents the movement or operation of another device.

As used herein, "mate" refers to coupling at a predefined interface.

As used herein, the terms "processor", "central processor", "central processing unit", "CPU", or "microprocessor" refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure, a "sensor" is a device that quantitatively measures a physical stimulus.

As used in this disclosure, a "valve" is a device that is used to control the flow of a fluid (gas or liquid) through a pipe or to control the flow of a fluid into and out of a container. Some valves may have multiple ports and may allow the diverting or mixing of fluids.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A hydrant monitoring system comprising:
a hydrant port adapter, a fixed arm, a movable arm, a protective frame, an operator interface unit, a distance sensor, and a handle;
wherein the hydrant monitoring system is coupled to a dry barrel fire hydrant and measures vertical distances inside of the dry barrel fire hydrant and outside of the dry barrel fire hydrant to determine whether the dry barrel fire hydrant is empty.

2. The hydrant monitoring system according to claim 1
wherein the hydrant port adapter is a ring-shaped coupler that is oriented to lie in a vertical plane;
wherein the hydrant port adapter comprises an inside thread such that the hydrant port adapter mates with a port of the dry barrel fire hydrant;
wherein the hydrant port adapter supports the hydrant monitoring system above ground when the hydrant port adapter is secured to the port of the dry barrel fire hydrant.

3. The hydrant monitoring system according to claim 2
wherein the hydrant port adapter comprises a first ring and a second ring which rotate independently of each other such that the hydrant monitoring system is installed on the dry barrel fire hydrant by rotating the first ring onto the thread of the port without requiring the rotation of the hydrant monitoring system in its entirety.

4. The hydrant monitoring system according to claim 2
wherein the fixed arm comprises two or more support rods;
wherein the fixed arm supports the protective frame above the ground;
wherein the fixed arm supports and guides the movable arm.

5. The hydrant monitoring system according to claim 4
wherein one of the two or more support rods comprises a sensor gap through which the distance sensor makes a first distance measurement to determine the distance between the ground and the hydrant monitoring system.

6. The hydrant monitoring system according to claim 4
wherein the movable arm is an armature that is slidably coupled to the fixed arm;
wherein the movable arm slides on the two or more support rods that pass through apertures on the movable arm;
wherein the movable arm couples to the fixed arm at the end of the movable arm that is closest to the protective frame;
wherein the movable arm extends from the coupling with the fixed arm towards the dry barrel fire hydrant.

7. The hydrant monitoring system according to claim 6
wherein the distance sensor is coupled to the bottom of the movable arm at the end of the movable arm that is closest to the dry barrel fire hydrant;
wherein the length of the movable arm is such that the distance sensor can be moved to a position inside the dry barrel fire hydrant and at the center of the dry barrel fire hydrant while the coupling between the movable arm and the fixed arm remains outside of the dry barrel fire hydrant.

8. The hydrant monitoring system according to claim 7
wherein the movable arm travels horizontally between a WITHDRAWN POSITION and an INSERTED POSITION;
wherein when in the WITHDRAWN POSITION, the distance sensor is located outside of the dry barrel fire hydrant, above the ground, and with an unobstructed view of the ground;
wherein the distance sensor is located above the sensor gap when in the WITHDRAWN POSITION;
wherein when in the WITHDRAWN POSITION, the hydrant monitoring system uses the distance sensor to make the first distance measurement to determine the distance between the hydrant monitoring system and the ground.

9. The hydrant monitoring system according to claim 8
wherein when in the INSERTED POSITION, the distance sensor is located inside of the dry barrel fire hydrant and at the center of the dry barrel fire hydrant;
wherein when in the INSERTED POSITION, the hydrant monitoring system uses the distance sensor to make a second distance measurement to determine the distance between the hydrant monitoring system and the bottom of a barrel inside of the dry barrel fire hydrant.

10. The hydrant monitoring system according to claim 9 wherein the movable arm comprises a locking knob to lock the movable arm in place while making the first distance measurement or the second distance measurement;

wherein the locking knob increases friction between the movable arm and the fixed arm when turned in one direction and decreases friction between the movable arm and the fixed arm when turned in the other direction.

11. The hydrant monitoring system according to claim 10 wherein the protective frame is a holder for the operator interface unit;

wherein the protective frame is coupled to the fixed arm at the end of the fixed arm that is opposite the hydrant port adapter;

wherein the protective frame is oriented to provide a horizontal surface upon which the operator interface unit is placed;

wherein the protective frame comprises one or more lips to retain the operator interface unit in the protective frame.

12. The hydrant monitoring system according to claim 11 wherein the operator interface unit comprises a processor and a memory wherein the memory contains instructions for causing the processor to control the sequence and timing of measurements, calculations, and the presentation of a result.

13. The hydrant monitoring system according to claim 12 wherein the operator interface unit directs the operation of the hydrant monitoring system by instructing that the distance sensor should be moved to the WITHDRAWN POSITION, by initiating the first distance measurement, by instructing that the distance sensor should be moved to the INSERTED POSITION, by initiating the second distance measurement, by performing the calculations to determine the distance between the ground and the bottom of the barrel, and by presenting the distance between the ground and the bottom of the barrel as the result;

wherein the operator interface unit presents instructions to move the movable arm and the result on a display screen.

14. The hydrant monitoring system according to claim 13 wherein the operator interface unit further comprises a battery;

wherein the battery comprises one or more energy-storage devices;

wherein the battery is a source of electrical energy to operate the operator interface unit and the distance sensor;

wherein the battery is replaceable or rechargeable.

15. The hydrant monitoring system according to claim 14 wherein the operator interface unit activates the distance sensor to make the first distance measurement or the second distance measurement;

wherein the first distance measurement or the second distance measurement is made by transmitting an ultrasonic pulse from the distance sensor and then timing how long it takes for the distance sensor to receive the ultrasonic pulse after it reflects off of an object.

16. The hydrant monitoring system according to claim 15 wherein the operator interface unit determines the distance from the ground to the bottom of the barrel inside the dry barrel fire hydrant;

wherein the operator interface unit is adapted to instruct an operator to make the first distance measurement with the distance sensor in the WITHDRAWN POSITION;

wherein the operator interface unit is adapted to instruct the operator to then make the second distance measurement with the distance sensor in the INSERTED POSITION;

wherein the operator interface unit subtracts the first distance measurement from the second distance measurement to compute a difference distance;

wherein the difference distance represents the distance from the ground to the bottom of the barrel inside the dry barrel fire hydrant;

wherein if the difference distance is less than a predetermined threshold distance it indicates that there is water pooling in the bottom of the barrel and therefore the dry barrel fire hydrant is reported as requiring service.

17. The hydrant monitoring system according to claim 16 wherein the hydrant monitoring system comprises a temperature sensor, a humidity sensor, a barometric pressure sensor, or a combination thereof;

wherein using readings obtained from the temperature sensor, the humidity sensor, and/or the barometric pressure sensor, the operator interface unit corrects the speed of sound based upon the current temperature, humidity, and/or barometric pressure to obtain more accurate distance measurements;

wherein the temperature sensor, the humidity sensor, and/or the barometric pressure sensor are mounted on the end of the movable arm adjacent to the distance sensor such that they measure temperature, humidity, and/or pressure inside of the dry barrel fire hydrant when the distance sensor in is the INSERTED POSITION.

18. The hydrant monitoring system according to claim 16 wherein the distance sensor comprises an ultrasonic transmitter and an ultrasonic receiver that are mounted adjacent to each other and oriented in the same direction;

wherein the ultrasonic transmitter transmits the ultrasonic pulse and the ultrasonic receiver detects the reflection of the ultrasonic pulse;

wherein the timing between transmission of the ultrasonic pulse and the detection of the ultrasonic pulse is indicative of the distance between the distance sensor and the object that the ultrasonic pulse reflected off of.

19. The hydrant monitoring system according to claim 18 wherein the handle is an armature coupled to the top of the protective frame for grasping.

* * * * *